United States Patent [19]

Wood et al.

[11] 4,046,548

[45] Sept. 6, 1977

[54] APPARATUS FOR PRODUCING SPHERICAL PARTICLES

[75] Inventors: Thomas K. Wood, Essex Fells; Alan R. Margreither, Wyckoff, both of N.J.

[73] Assignee: Potters Industries, Inc., Hasbrouck Heights, N.J.

[21] Appl. No.: 681,189

[22] Filed: Apr. 28, 1976

[51] Int. Cl.[2] ............................................ C03B 19/10
[52] U.S. Cl. ...................................... 65/142; 65/355; 432/223
[58] Field of Search .................... 432/223; 65/142, 21, 65/347, 355

[56] References Cited

U.S. PATENT DOCUMENTS

| 1,973,688 | 9/1934 | Geer ........................................ 65/347 |
| 2,838,881 | 6/1958 | Plumat ..................................... 65/142 |
| 2,945,326 | 7/1960 | Wood ....................................... 65/142 |
| 3,097,832 | 7/1963 | Murdock et al. ................... 65/142 X |
| 3,829,285 | 8/1974 | Beck ....................................... 432/223 |

*Primary Examiner*—Robert L. Lindsay, Jr.
*Attorney, Agent, or Firm*—Lee C. Robinson, Jr.

[57] ABSTRACT

A system for producing glass spheres in which the combustion air introduced into the furnace is preheated. The furnace has a shroud enclosing at least a portion of its outer surface, and ambient air is introduced to the space between the outer surface and the shroud by means of a fan generating a slight positive pressure. Preheated air is removed from the shroud by a plurality of ducts leading to the source of heat.

19 Claims, 4 Drawing Figures

APPARATUS FOR PRODUCING SPHERICAL PARTICLES

BACKGROUND OF THE INVENTION

The present invention, while applicable generally to the preheating of combustion supporting gases, is particularly suited for furnaces used in the production of glass spheres.

It is well known to produce glass beads or spheres by introducing crushed glass particles into a vertically disposed draft tube. The tube has a source of heat near its lower end, normally a well distributed gas flame produced by a series of burners. As the combustion gases rise, they proceed into an expansion chamber and carry with them the glass particles which become soft, so that by surface tension the particles are shaped into spherical form. Such bead producing systems are discussed in more detail, for example, in U.S. Pat. No. 2,619,776, granted Dec. 2, 1952, to Rudolph H. Potters and in U.S. Pat. No. 2,945,326, granted July 19, 1960, to Thomas K. Wood.

Heretofore, bead producing furnaces of the foregoing type have been provided with air for combustion at ambient temperature. One of the more common prior systems involved the introduction of the combustion air through an opening in the draft tube below the heat source. The draft created by the rising combustion gases drew ambient air into the draft tube where it was mixed with a combustible fluid and ignited.

As the burning gases rose, much of their heat was transferred through the walls of the draft tube and the expansion chamber. Excessive heating of these walls will result in their deterioration as well as the adhesion of molten glass particles thereto, and in some cases it was necessary to develop cooling systems involving the direction of ambient air against the outer walls of the expansion chamber to meet this problem. These arrangements were basically inefficient, however, and the heat loss through the walls of the expansion chamber resulted in a substantial wastage of the available heat energy.

SUMMARY

One general object of this invention, therefore, is to provide a new and improved system for conserving energy in the manufacture of glass spheres or other spherical particles.

More specifically, it is an object of the invention to provide apparatus for utilizing the heat removed from the walls of a sphere-producing furnace to preheat the combustion supporting gases for the furnace.

Another object of the invention is to provide apparatus for supplying preheated air to the heat source for a furnace of this general type.

A further object of this invention is to provide apparatus for achieving significant savings in fuel through the use of preheated air.

Still another object of this invention is to provide sphere-producing apparatus in which an evenly distributed flow of combustion air is supplied to the source of heat.

In one illustrative embodiment of the invention, a source of heat is disposed within the substantially vertical draft tube of a bead furnace. A shroud or other enclosure surrounds at least a portion of the outer surface of the furnace above the heat source and defines an annular air gap between the inner wall of the shroud and the outer wall of the furnace. At least one upstanding duct communicates with the shroud and leads to the source of heat. As ambient air is introduced between the shroud and the outer furnace wall, the air is heated and enters the duct. The duct directs the preheated air downwardly to the source of heat in the form of a continuous stream of combustion-supporting gas.

In accordance with one feature of the invention, the combustion-supporting gas is introduced into the shroud at a point which is spaced sufficiently from the point where the preheated gas is removed to allow a significant elevation of temperature. The gas is maintained at an elevated temperature as it reaches the source of heat with the result that the overall energy consumption of the apparatus is substantially reduced.

In accordance with another feature of the invention, in certain preferred embodiments, the combustion-supporting gas is fed to the shroud at ambient temperature but under positive pressure. The arrangement is such that a continuous and uniform flow of preheated gas is supplied to the source of heat.

In accordance with a further feature of several good embodiments of the invention, the combustion-supporting gas is introduced into the lower portion of the shroud and is removed from the upper portion, such that the heating of the gas within the shroud causes it to rise and facilitates the flow of gas into the duct. In other advantageous arrangements the combustion-supporting gas enters the shroud adjacent its upper portion and is removed adjacent the lower portion. These latter embodiments enable the realization of an even higher gas temperature as the gas approaches the source of heat.

In accordance with another feature of several advantageous embodiments of the invention, the combustion-supporting gas enters the shroud through a plurality of infeed ducts communicating with the shroud at points equidistant from each other about the circumference of the furnace. The heating of the gas is accomplished in a uniform and efficient manner as it flows from the infeed ducts and is distributed around the furnace.

In accordance with another feature of the invention, in certain important embodiments, a plurality of upstanding ducts communicate with the shroud at points equidistant about the circumference of the furnace to remove the preheated combustion-supporting gas. The opposite ends of these latter ducts communicate with the draft tube below the source of heat at equidistant intervals about the circumference of the tube to provide a uniform flow of preheated gas to the heat source.

BRIEF DESCRIPTION OF THE DRAWINGS

The present invention, as well as further objects and features thereof, will be understood more clearly and fully from the following description of certain preferred embodiments, when read with reference to the accompanying drawings, in which.

DESCRIPTION OF CERTAIN PREFERRED EMBODIMENTS

Figure 1:
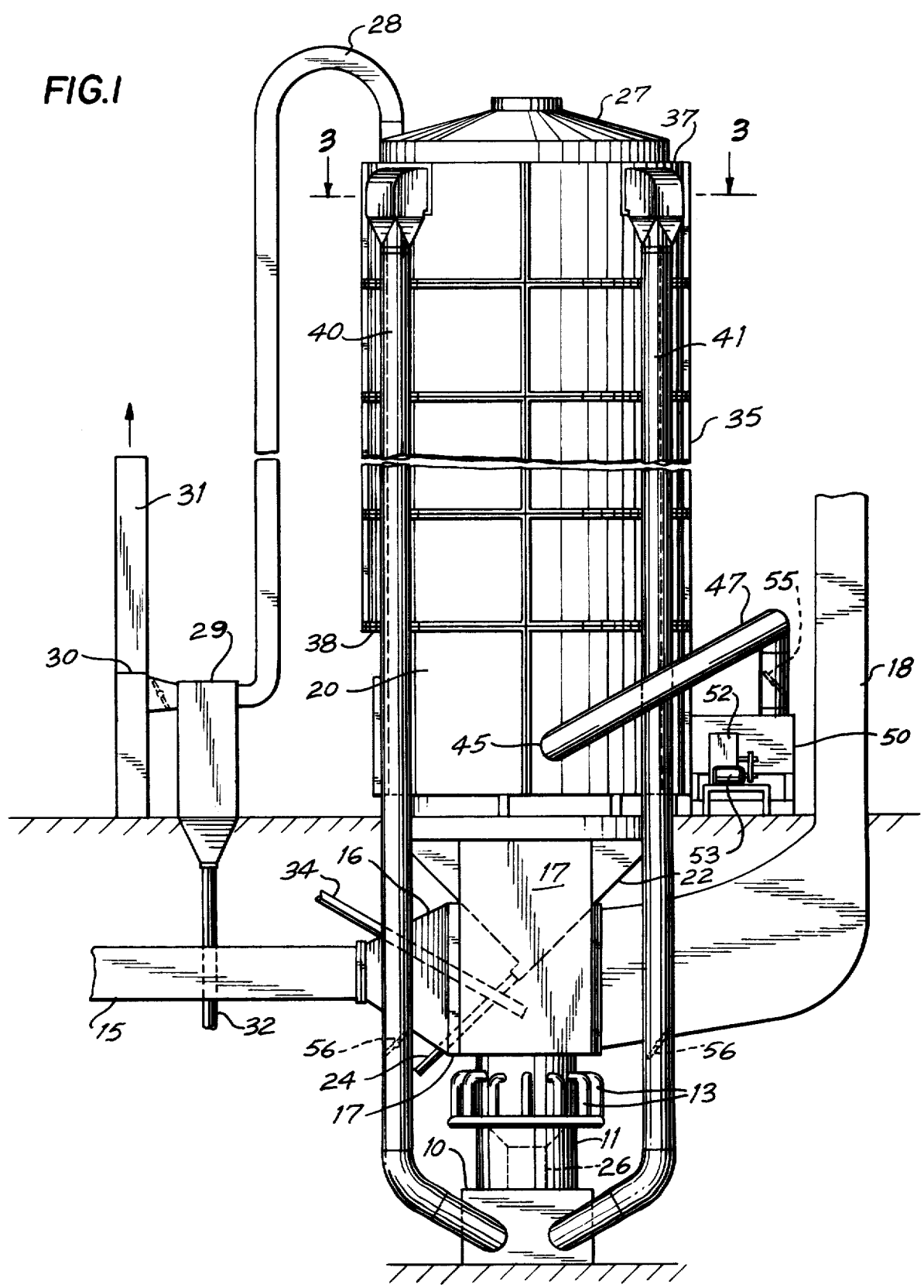
FIG. 1 is a diagrammatic elevational view of apparatus for producing spherical particles in accordance with one illustrative embodiment of the invention.
Figure 2:
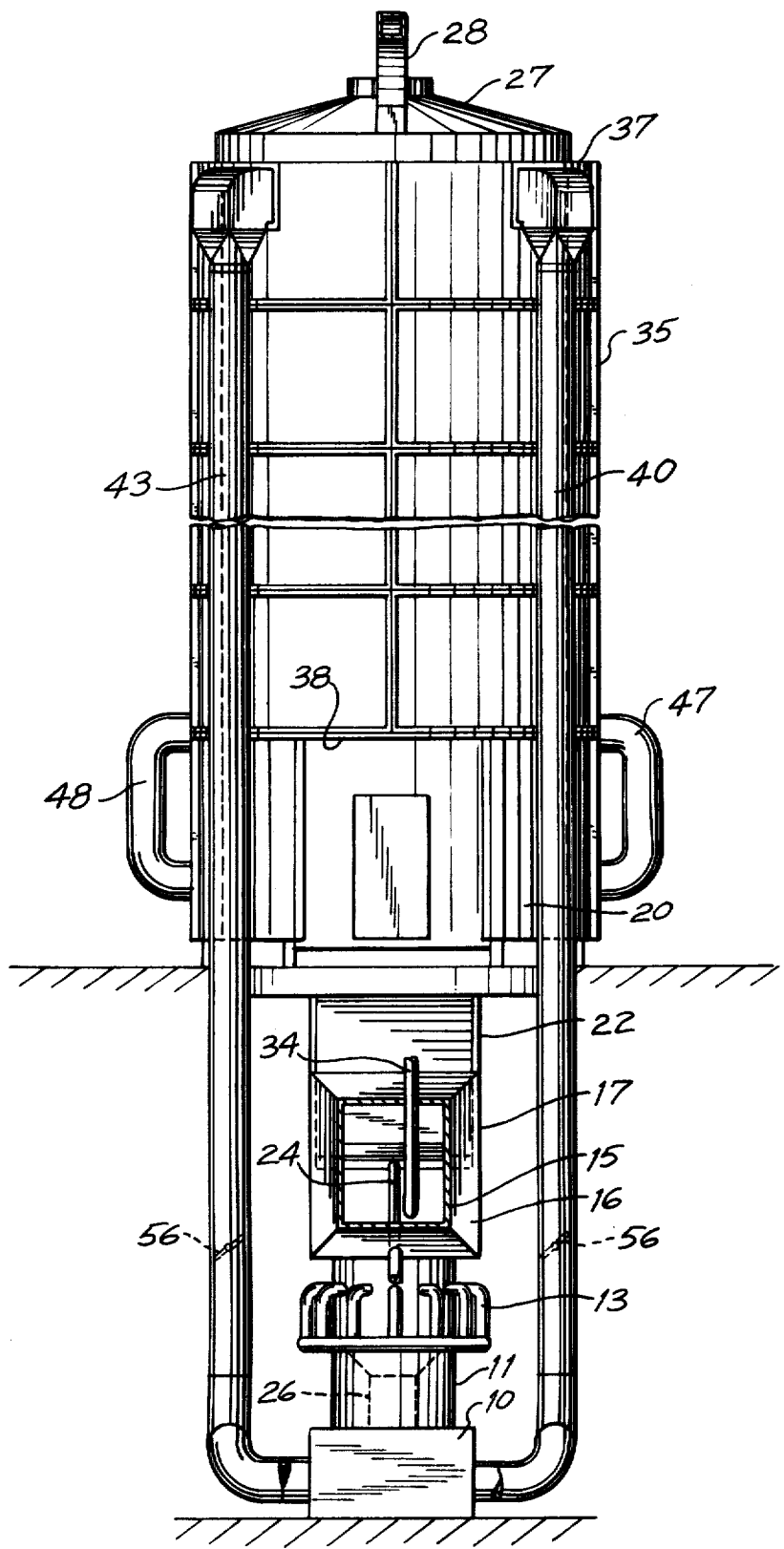
FIG. 2 is a sectional view of the apparatus shown in FIG. 1, with certain portions omitted for purposes of clarity.

With reference to FIGS. 1 and 2, a glass sphere making furnace is shown with preheating apparatus in accordance with one embodiment of the invention. The furnace includes a base member 10 and an upwardly extending draft tube 11 resting on the base member. A series of equally spaced gas burners 13 project into the draft tube 11 adjacent its lower portion and extend about the periphery of the tube to provide a source of heat.

The draft tube 11 is cooled in the usual manner by ambient air injected from a duct 15 and an expanded portion 16 to a plenum chamber 17 which surrounds the tube. The cooling air is exhausted through a stack 18.

Extending above the upper end of the draft tube 11 is a cylindrical expansion chamber 20. The chamber 20 surrounds the upper portion of draft tube 11 in coaxial relationship therewith. A collection chamber 22 is located at the lower end of the expansion chamber 21 around the draft tube 11 and is provided with one or more outfeed conduits 24 leading to suitable collecting bins (not shown).

The draft within the draft tube 11 and the expansion chamber 20 is carefully regulated to control the flow of combustion gases from the burners 13. As more fully described in the above Wood Pat. No. 2,945,326, a draft regulator 26 is located at the lower end of the tube 11 and is suitably supported by the base member 10. A cover 27 serves to substantially close the upper end of the chamber 20. The cover 27 includes an opening which communicates with a duct 28, and this duct extends in a downward direction through a separator 29 to a suction fan 30 which exhausts upwardly through a stack 31 open to the atmosphere.

As is well known, crushed glass particles are continuously fed through a suitable infeed conduit 34 to the draft tube 11. In some cases the incoming particles may be preheated in the manner disclosed, for example, in Arthur G. Nylander U.S. Pat. No. 3,560,185. As the particles enter the tube 11, they are entrained with the upward flow of hot gases from the burners 13. The particles proceed into the expansion chamber 20 and become heated to a temperature sufficient to cause the softening and shaping thereof by surface tension into spherical form. The particles thereupon solidify in the form of glass spheres.

A substantial percentage of the larger spheres falls through the relatively quiescent lateral zones of the expansion chamber 20 to the collection chamber 22. These spheres pass outwardly through the outfeed conduit 24 where they are collected for grading and packaging. The smaller solidified spheres continue their upward movement with the combustion gases in the chamber 20 and pass through the cover 27 and into the duct 28. The spheres are separated from the entraining gases in the separator 29 and are discharged through an outfeed conduit 32 into suitable containers (not shown).

The system described thus far is merely illustrative of a known combination of sphere-producing components. It will be readily apparent in any such combination that when the apparatus is in operation the temperature within the expansion chamber 20 becomes quite high, and there is a substantial amount of heat which radiates through the cylindrical wall of the chamber and heretofore has been lost to the atmosphere.

The illustrated embodiments of the invention make use of this otherwise wasted heat by employing it to preheat the ambient air or other combusting-supporting gas for the burners 13. The air being fed to the burners is at an elevated temperature, with the result that the fuel consumption of the burners for a given Btu output is greatly reduced. The apparatus operates as a heat exchanger to convert the heat surrounding the expansion chamber into additional energy input to the burners. The resulting saving in fuel costs is substantial, and for burners using natural gas, for example, it is not uncommon to achieve a cost reduction of 25 percent or more through the use of the present invention.

In accomplishing these ends, the expansion chamber 20 is surrounded at least in part by a cylindrical shroud or other enclosure indicated generally at 35. The shroud 35 defines an annular gap between the shroud's inner wall and the outer wall of the expansion chamber 20. The space between the upper edge of the shroud 35 and the expansion chamber 20 is closed by an annular plate 37, and a second annular plate 38 similarly closes the space between the lower edge of the shroud and the chamber.

Four upstanding ducts 40, 41, 42 and 43 are disposed at equidistant locations about the periphery of the cylindrical shroud 35. The upper ends of these ducts communicate with the interior of the shroud 35 and are located in close proximity with the extreme upper portion of the furnace. The ducts extend in a downward direction, and their lower ends are connected to the base member 10 beneath the burners 13. The ducts communicate directly with the burners through the interior of the base member and the draft tube 11.

The shroud 35 is provided adjacent its lower end with a pair of infeed openings 45 and 46. The openings 45 and 46 are circumferentially displaced 180° apart and are respectively located intermediate the adjacent pairs of the ducts 40 and 41, and 42 and 43. Two laterally extending infeed ducts 47 and 48 communicate with the openings 45 and 46, respectively, and these latter ducts lead to a plenum 50. The plenum 50 is of hollow generally cylindrical configuration and is suitably supported adjacent one side of the furnace in juxtaposition with the lower portion of the expansion chamber 20. The plenum 50 is supplied with ambient air at a slight positive pressure by a fan 52 within the infeed opening of the plenum. The fan 52 operates under the control of a drive motor 53.

In operation, the pressurized ambient air within the plenum 50 is directed through the ducts 47 and 48 and into the annular space between the expansion chamber 20 and the surrounding shroud 35. The thus introduced air is preheated by the hot external wall of the chamber 20, and the air rises within the space between the chamber 20 and the shroud 35 and reaches the upper portion of this space under increased positive pressure.

The preheated air then enters the upstanding ducts 40, 41, 42 and 43. The air proceeds downwardly through these ducts and enters the base member 10 immediately beneath the burners 13. The incoming preheated air serves to support the combustion of the burner fuel with the result that substantially less fuel is required than would otherwise be the case. In addition, the ambient air being introduced through the infeed openings 45 and 46 has a cooling effect which serves to maintain the temperature of the exterior wall of the expansion chamber 20 at a reduced level.

In some embodiments the flow of ambient room-temperature air from the plenum 50 is regulated by a damper valve 55. To provide additional control a further damper valve 56 is disposed within each of the upstanding ducts 40, 41, 42 and 43 a short distance above the point at which the duct enters the base member 10. These damper valves are adjustable to insure an evenly distributed flow of preheated air to the source of heat.

Figure 3:
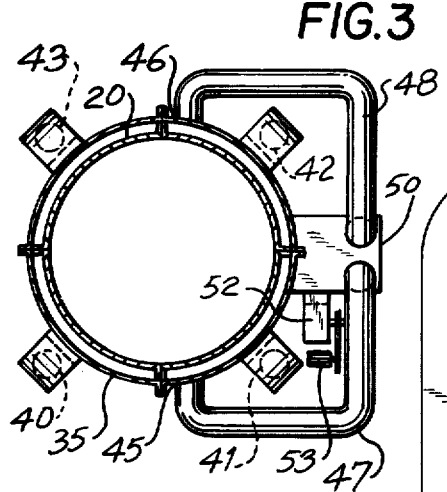
FIG. 3 is a fragmentary sectional view taken along line 3—3 in FIG. 1.

In the embodiment of FIGS. 1-3 the ambient room-temperature air is introduced adjacent the lower portion of the shroud 35 and is withdrawn in the form of preheated air from adjacent the upper portion of the shroud. With this arrangement, the natural tendency of the air within the shroud to rise as its temperature increases serves to assist the flow of preheated air to the burners 13.

In other advantageous embodiments the ambient air is introduced into the upper portion of the shroud and is withdrawn in the form of preheated air from the shroud's lower portion. These latter arrangements make use of the higher temperature adjacent the lower exterior wall of the expansion chamber 20 to provide an even further increase in the temperature of the air leading to the burners 13.

Figure 4:
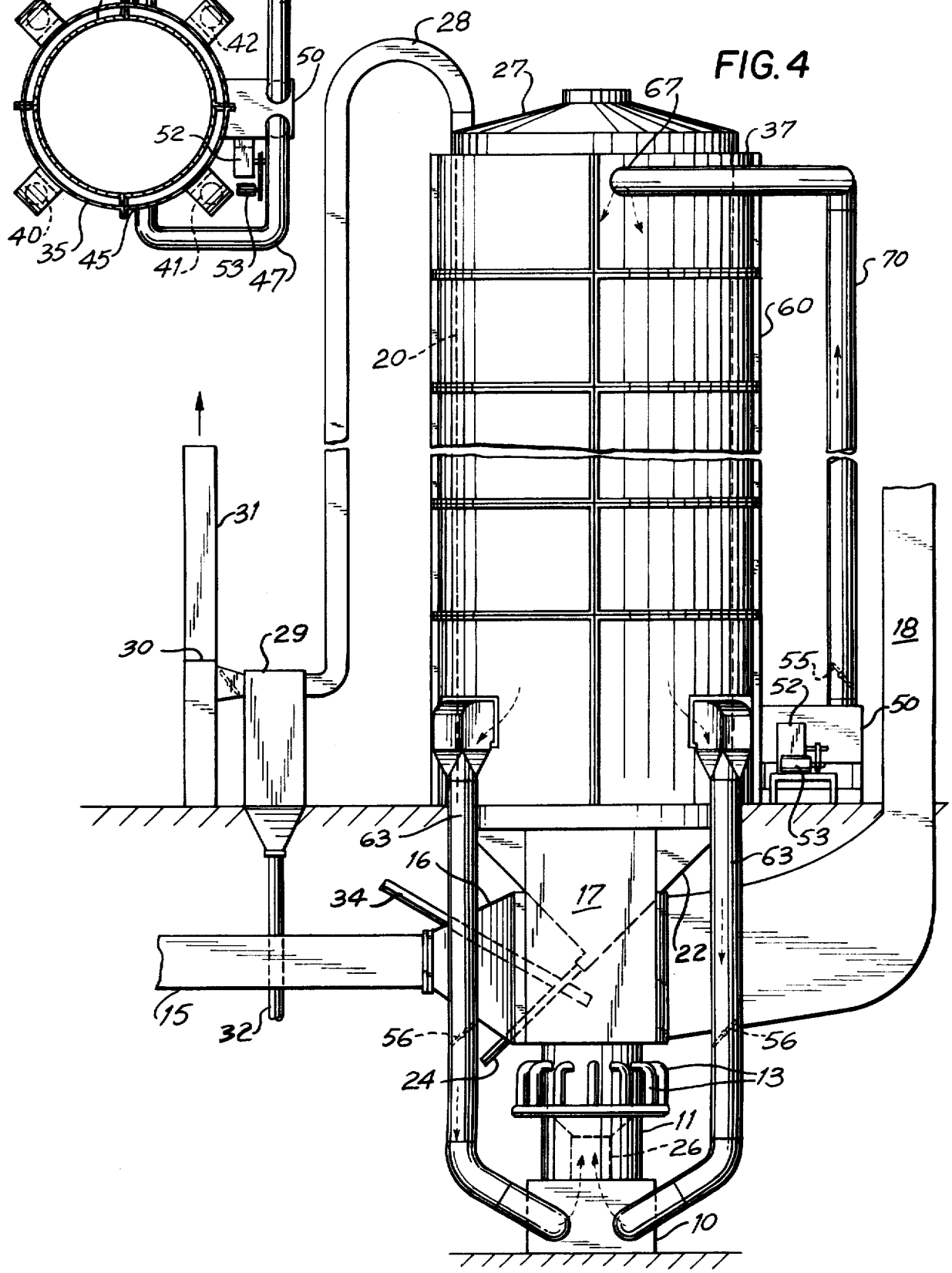
FIG. 4 is a diagrammatic elevational view of apparatus for producing spherical particles in accordance with another illustrative embodiment of the invention.

Referring to FIG. 4, for example, there is shown a bead furnace of a type similar to that described heretofore which includes a cylindrical shroud 60 around the expansion chamber 20. Communicating with the space between the chamber 20 and the shroud 60 are four upstanding ducts 63. These ducts are substantially shorter than the upstanding ducts in the embodiment of FIGS. 1-3 and are arranged such that their upper ends are connected to the shroud adjacent its lowermost portion. The opposite or lower ends of the ducts lead to the base member 10 to direct preheated air to the burners 13 in the manner described below.

The extreme upper portion of the shroud 60 is provided with two infeed openings 67. The openings 67 are in oppositely disposed relationship with each other and communicate with corresponding infeed ducts 70. These latter ducts extend from the shroud 60 in a generally horizontal direction and then proceed downwardly to the plenum 50.

As the fan 52 forces ambient air into the plenum 50, the air is directed under positive pressure through the infeed ducts 70 to the upper portion of the space between the expansion chamber 20 and the cylindrical shroud 60. The thus introduced air is raised to an elevated temperature by the hot exterior wall of the expansion chamber, and the preheated air reaches its highest temperature adjacent the lower portion of the expansion chamber wall because of the comparatively high temperature of the wall at this point. The air proceeds through the upstanding ducts 63, the base member 10 and the draft tube 11 to the burners 13 to supply elevated temperature air to the source of heat.

In some embodiments of the invention the preheated combustion air may be obtained from around the exhaust duct 28 through the use of a shroud around the duct. Such a shroud may be employed either in addition to or in lieu of the shroud around the expansion chamber and may be connected to suitable additional ducts to direct the air to the source of heat.

Although the illustrated embodiments of the invention have particular utility in the preheating of ambient air to support combustion in a furnace for producing glass spheres, in other good embodiments the apparatus may be used to preheat air or other combustion supporting gas in different types of furnaces characterized by an upward draft of burning gases. Various additional types of furnaces with which the invention may be employed will be apparent to those skilled in the art upon a perusal of the present disclosure.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

We claim:

1. Apparatus for producing spherical particles comprising, in combination:
   a vertical draft tube having an infeed opening adjacent its lower end;
   heat source means disposed within said draft tube intermediate its ends
   an expansion chamber communicating with and extending above said draft tube, said heat source means maintaining the interior of the expansion chamber at an elevated temperature;
   means for introducing particles of sphere forming material into said draft tube above said heat source means, the introduced particles being carried upwardly into the expansion chamber by the heat from said heat source means and being shaped by surface tension into spherical form;
   enclosure means disposed about the expansion chamber in spaced relationship therewith, the enclosure means having at least one infeed opening therein;
   means for introducing combustion supporting gas into the infeed opening of the enclosure means, the gas introduced through said infeed opening flowing into the space between the enclosure means and the expansion chamber and being raised to an elevated temperature by the heat from said heat source means; and
   means for withdrawing the heated gas from the space between the enclosure means and the expansion chamber and for feeding the withdrawn gas to the infeed opening of said draft tube.

2. Apparatus for producing spherical particles comprising, in combination:
   a vertical draft tube having an infeed opening adjacent its lower end;
   heat source means disposed within said draft tube intermediate its ends;
   an expansion chamber communicating with and extending above said draft tube, said heat source means maintaining the interior of the chamber at an elevated temperature;
   means for introducing particles of sphere forming material into the draft tube adjacent said heat source means, the introduced particles being carried upwardly into the expansion chamber by the heat from said heat source means and being shaped by surface tension into spherical form;
   enclosure means disposed about the expansion chamber in spaced relationship therewith, the enclosure means having at least one infeed opening therein;
   means for introducing combustion supporting gas into the infeed opening of the enclosure means, the gas introduced through said infeed opening flowing into the space between the enclosure means and the expansion chamber and being raised to an elevated temperature by the heat from said heat source means; and means including a plurality of upstanding discharge ducts for withdrawing the heated gas from the space between the enclosure means and the expansion chamber and for feeding the withdrawn gas to the infeed opening of said draft tube.

3. Apparatus as set forth in claim 2, in which each of said discharge ducts communicates with the enclosure means adjacent its upper end.

4. Apparatus as set forth in claim 2, in which each of said discharge ducts communicates with the enclosure means adjacent its lower end.

5. Apparatus for producing spherical particles comprising, in combination:

a furnace including a vertical draft tube having an infeed opening adjacent its lower end heat source means disposed within said draft tube intermediate its ends and an expansion chamber communicating with and extending above said draft tube, said heat source means maintaining the interior of the chamber at an elevated temperature;

means for introducing particles of sphere forming material into the furnace adjacent said heat source means, the introduced particles being carried upwardly into the expansion chamber by the heat from said heat source means and being shaped by surface tension into spherical form;

enclosure means disposed about the expansion chamber in spaced relationship therewith, the enclosure means having a plurality of infeed openings therein;

means including a pair of infeed ducts respectively communicating with said openings for introducing combustion supporting gas into the enclosure means, the gas introduced through said infeed openings flowing into the space between the enclosure means and the expansion chamber and being raised to an elevated temperature by the heat from said heat source means; and means for withdrawing the heated gas from the space between the enclosure means and the expansion chamber and for feeding the withdrawn gas to the infeed opening of said draft tube.

6. Apparatus as set forth in claim 5, in which said expansion chamber and said enclosure means are of cylindrical configuration and extend upwardly in concentric relationship with each other.

7. Apparatus as set forth in claim 6, in which said infeed openings are disposed in the lower portion of the enclosure means.

8. Apparatus as set forth in claim 6, in which said infeed openings are disposed in the upper portion of the enclosure means.

9. Apparatus for producing spherical particles comprising, in combination:

a vertical draft tube having an infeed opening adjacent its lower end;

heat source means disposed within said draft tube intermediate its ends an expansion chamber communicating with and extending above said draft tube, said heat source means maintaining the interior of the expansion chamber at an elevated temperature;

means for introducing particles of sphere forming material into the draft tube adjacent said heat source means, the introduced particles being carried upwardly into the expansion chamber by the heat from said heat source means and being shaped by surface tension into spherical form;

enclosure means disposed about the expansion chamber in spaced relationship therewith, the enclosure means having a plurality of infeed openings therein;

means including a pair of infeed ducts respectively communicating with said openings for introducing combustion supporting gas into the enclosure means, the gas introduced through said infeed openings flowing into the space between the enclosure means and the expansion chamber and being raised to an elevated temperature by the heat from said heat source means; and a plurality of upstanding discharge ducts for withdrawing the heated gas from the space between the enclosure means and the expansion chamber and for feeding the withdrawn gas to the infeed opening of said draft tube.

10. Apparatus as set forth in claim 9, in which said infeed ducts communicate with the lower portion of the enclosure means and said discharge ducts communicate with the upper portion of the enclosure means.

11. Apparatus as set forth in claim 9, in which said infeed ducts communicate with the upper portion of the enclosure means and said discharge ducts communicate with the lower portion of the enclosure means.

12. Apparatus for producing glass beads comprising, in combination:

a vertical draft tube having an infeed opening adjacent its lower end;

heat source means disposed within the draft tube intermediate its ends;

an expansion chamber communicating with and extending above said draft tube, the source of heat maintaining the interior of the chamber at an elevated temperature;

enclosure means disposed about the expansion chamber in spaced relationship therewith;

a plurality of upstanding discharge ducts, each of said discharge ducts communicating at a first end with said enclosure means and communicating at a second end with said draft tube at its infeed opening;

a plurality of infeed ducts, each of said infeed ducts communicating at one of its ends with said enclosure means;

plenum means communicating with the opposite ends of said infeed ducts; and means for introducing air at ambient temperature into the plenum means under positive pressure, the introduced air flowing through the infeed ducts into the space between the enclosure means and the expansion chamber and being raised to an elevated temperature by the heat within said chamber, the thus heated air flowing through the discharge ducts to said draft tube.

13. Apparatus as set forth in claim 12, which further comprises, in combination:

valve means disposed within each of the discharge ducts for regulating the flow of air thereto.

14. Apparatus as set forth in claim 12, in which said expansion chamber and said enclosure means are of cylindrical configuration and extend upwardly in concentric relationship with each other.

15. Apparatus as set forth in claim 14, in which said first ends of the discharge ducts are circumferentially spaced around the upper portion of the enclosure means in equidistant relationship with each other, and in which said one ends of the infeed ducts are circumferentially spaced around the lower portion of the enclosure means in equidistant relationship with each other.

16. Apparatus as set forth in claim 14, in which said first ends of the discharge ducts are circumferentially spaced around the lower portion of the enclosure means in equidistant relationship with each other, and in which said one ends of the infeed ducts are circumferentially spaced around the upper portion of the enclosure means in equidistant relationship with each other.

17. Apparatus as set forth in claim 15, in which said first ends of the discharge ducts are circumferentially spaced intermediate said one ends of the infeed ducts.

18. Apparatus as set forth in claim 16, in which said first ends of the discharge ducts are circumferentially spaced intermediate said one ends of the infeed ducts.

19. Apparatus as set forth in claim 1, in which said infeed opening of said draft tube comprises a plurality of openings evenly spaced about the lower end of said draft tube, and said means for withdrawing the heated gas comprises a plurality of discharge ducts each communicating with a respective one of said openings at one end and with said enclosure means at its other end.

* * * * *